(12) United States Patent
Petrovic et al.

(10) Patent No.: US 9,838,156 B1
(45) Date of Patent: Dec. 5, 2017

(54) SYSTEMS AND METHODS FOR PERFORMING EFFICIENT BLIND DECODING AT A WIRELESS RECEIVER

(71) Applicant: Marvell International Ltd., Hamilton (BM)

(72) Inventors: Vladan Petrovic, San Jose, CA (US); Yakun Sun, Sunnyvale, CA (US); Jungwon Lee, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/206,837

(22) Filed: Jul. 11, 2016

Related U.S. Application Data

(63) Continuation of application No. 14/070,712, filed on Nov. 4, 2013, now Pat. No. 9,407,481, which is a continuation of application No. 13/160,971, filed on Jun. 15, 2011, now Pat. No. 8,588,347.

(60) Provisional application No. 61/357,879, filed on Jun. 23, 2010.

(51) Int. Cl.
*H04L 1/00* (2006.01)

(52) U.S. Cl.
CPC .......... *H04L 1/0052* (2013.01); *H04L 1/0075* (2013.01)

(58) Field of Classification Search
CPC ................. H04L 1/0075; H04L 1/0052
See application file for complete search history.

(56) References Cited

U.S. PATENT DOCUMENTS

| 2008/0240159 A1 | 10/2008 | Palanki et al. |
| 2008/0316995 A1 | 12/2008 | Bachu et al. |
| 2010/0180173 A1* | 7/2010 | Batra ............ H04L 1/1812 714/751 |
| 2010/0290419 A1* | 11/2010 | Wengerter ...... H04L 1/0027 370/329 |
| 2011/0026645 A1 | 2/2011 | Luo et al. |
| 2011/0182385 A1* | 7/2011 | Doan ............ H03M 13/3738 375/340 |
| 2011/0228883 A1* | 9/2011 | Liu ............... H04L 1/08 375/341 |

* cited by examiner

*Primary Examiner* — Freshteh N Aghdam

(57) ABSTRACT

Systems and methods for performing efficient blind decoding. A first plurality of decision metrics corresponding to a first repetition of periodic decoding information is stored. The first plurality of decision metrics is grouped into sequential portions. A plurality of combined versions of the sequential portions is stored into combining buffers arranged in sequence. Each combined version is associated with a different sequence of timing information. A first of the plurality of combined versions stored in a first of the combining buffers is combined with a second version of a second plurality of decision metrics that corresponds to a second repetition of the periodic decoding information. The second version is associated with timing information adjacent in the timing information sequence to the timing information associated with the first combined version. The data is decoded based on information in the combining buffers.

12 Claims, 5 Drawing Sheets

500

504
store a first plurality of decision metrics corresponding to a first repetition of the periodic decoding information in a memory, wherein the first plurality of decision metrics is grouped into a plurality of sequential portions

506
store a plurality of combined versions of the sequential portions into a plurality of combining buffers that are arranged in sequence, wherein each combined version is associated with a different sequence of timing information

508
combine a first of the plurality of combined versions stored in a first of the combining buffers with a second version a second plurality of decision metrics that corresponds to a second repetition of the periodic decoding information, wherein the second version is associated with timing information adjacent in the timing information sequence to the timing information associated with the first combined version

510
decode the data based on information stored in the plurality of combining buffers

FIG. 5

SYSTEMS AND METHODS FOR PERFORMING EFFICIENT BLIND DECODING AT A WIRELESS RECEIVER

CROSS REFERENCE TO RELATED APPLICATION

This application is a continuation of U.S. patent application Ser. No. 14/070,712, filed Nov. 4, 2013 (currently allowed), which is a continuation of U.S. patent application Ser. No. 13/160,971, filed Jun. 15, 2011, (now U.S. Pat. No. 8,588,347), which claims the benefit of U.S. Provisional Application No. 61/357,879, filed Jun. 23, 2010, each of which is hereby incorporated by reference herein in its entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly not impliedly admitted as prior art against the present disclosure.

Traditional receivers in wireless communication system receive a signal having data packets for which the decoding configuration is unknown to the receiver. In particular, the receiver lacks knowledge as to where the decoding information in the data packet starts and the number of transmission antennas used to transmit the signal. In such circumstances, the receiver uses decoding information contained in the data packets to determine the decoding configuration required.

In order to determine the necessary information needed to decode the received signal, traditional systems apply a blind decoding technique. In blind decoding, every combination (hypothesis) of the transmission configuration and transmission timing (e.g, to identify the correct decoding information in the data packet) is searched, computed and applied to the received signal to determine whether the particular combination is correct (e.g., using parity information contained in the signal). Such decoding schemes require use of a large buffer to store the decoding information for each hypothesis and fail to identify the required decoder configuration quickly and efficiently.

SUMMARY

In accordance with the principles of the present disclosure, systems and methods are provided for performing efficient blind decoding at a wireless receiver, and more particularly to sharing storage of a combining buffer for different hypothesis (or combination of transmission configuration and timing information) of the unknown required decoding configuration using periodicity of the decoding information in the received signal. Decoding information refers to the underlying data in the transmitted signal before being scrambled. In particular, the underlying data of the decoding information may repeat in the received signal but the actual bits corresponding to the underlying data that are in the received signal may differ because different scrambling operations may be applied to each repetition of the underlying data in the transmission.

In some embodiments, a first plurality of decision metrics corresponding to a first repetition of the periodic decoding information is stored in a memory. The first plurality of decision metrics is grouped into a plurality of sequential portions. A plurality of combined versions of the sequential portions are stored into a plurality of combining buffers that are arranged in sequence. Each combined version is associated with a different sequence of timing information. A first of the plurality of combined versions stored in a first of the combining buffers is combined with a second combined version of a second plurality of decision metrics that corresponds to a second repetition of the periodic decoding information. The second version is associated with timing information adjacent in the timing information sequence to the timing information associated with the first combined version. The received data is decoded based on information stored in the plurality of combining buffers.

In some implementations, during a first time interval corresponding to a first received frame of data that includes the first repetition of the periodic decoding information, the first plurality of decision metrics is descrambled based on a first instance of the timing information. Each descrambled portion of the first plurality of decision metrics is stored in sequence into a combining buffer first in the sequence of the combining buffers. Each portion next in the sequence of the descrambled first plurality of decision metrics is combined with a portion of the first plurality of decision metrics stored previously in the combining buffer first in the sequence. The descrambling and the storing is repeated for each subsequent instance of the timing information. Each repetition stores the descrambled portions of the first plurality of decision metrics in one of the combining buffers that is next in the sequence of combining buffers relative to the previous iteration. In some implementations, during a second time interval corresponding to a second received frame of data that includes the second repetition of the periodic decoding information, the second plurality of decision metrics is descrambled based on the first instance of the timing information. Each descrambled portion of the second plurality of decision metrics is stored in sequence into a combining buffer adjacent in the sequence of the combining buffers to the combining buffer that stores the descrambled combined portions of the first plurality of decision metrics associated with the first instance of timing information. Each portion next in the sequence of the second plurality of decision metrics is combined with a portion of the second plurality of decision metrics stored previously in the combining buffer first in the sequence. The descrambling and the storing is repeated for each subsequent instance of the timing information. Each repetition stores the descrambled portions of the second plurality of decision metrics in one of the combining buffers that is next in the sequence of combining buffers relative to the previous iteration.

In some implementations, the received data is decoded based on information stored in the combining buffers during the first time interval. A determination is made as to whether the decoded received data is valid. When the decoded received data is determined to be invalid, the received data is decoded based on information stored in the combining buffers during the second time interval.

In some embodiments, before the combining, data stored in one of the plurality of combining buffers that during the corresponding time interval is first in the sequence of combining buffers is overwritten. In some implementations, a plurality of bits that corresponds to the received data signal is decoded based on the information stored in the combining buffers. An error detection code is applied to the decoded plurality of bits to determine whether the decoded plurality of bits is valid.

In some embodiments, the combining includes computing a sum. In some implementations, a determination is made as to how many antennas correspond to the received data based on the decoding. A determination is made as to an instance of the timing information corresponding to a start of the period of the periodic decoding information. In some implementations, receiver decoding circuitry is configured based on the determined number of antennas and the instance.

In some implementations, the plurality of decision metrics include log-likelihood ratios (LLRs) for code bits of periodic decoding information included in one of a plurality of received frames. In some implementations, the plurality of received frames corresponds to a Physical Broadcast Channel (PBCH) of a wireless communications network. In some embodiments, the timing information corresponds to a type of descrambling operation.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which:

FIG. 5 shows an illustrative flow diagram of an exemplary process for decoding data having embedded periodic decoding information in accordance with some embodiments of the present disclosure.

DETAILED DESCRIPTION

This disclosure generally relates to performing efficient blind decoding with a wireless receiver. For illustrative purposes, this disclosure is described in the context of a mobile phone system where the communication scheme involves Physical Broadcast Channel (PBCH) of a wireless communications network. It should be understood, however, that this disclosure is applicable to any wireless communications scheme where the decoding information embedded in a received data signal is periodic (e.g., WiFi, WiMAX, BLUETOOTH and/or 3GPP LTE).

Figure 1:
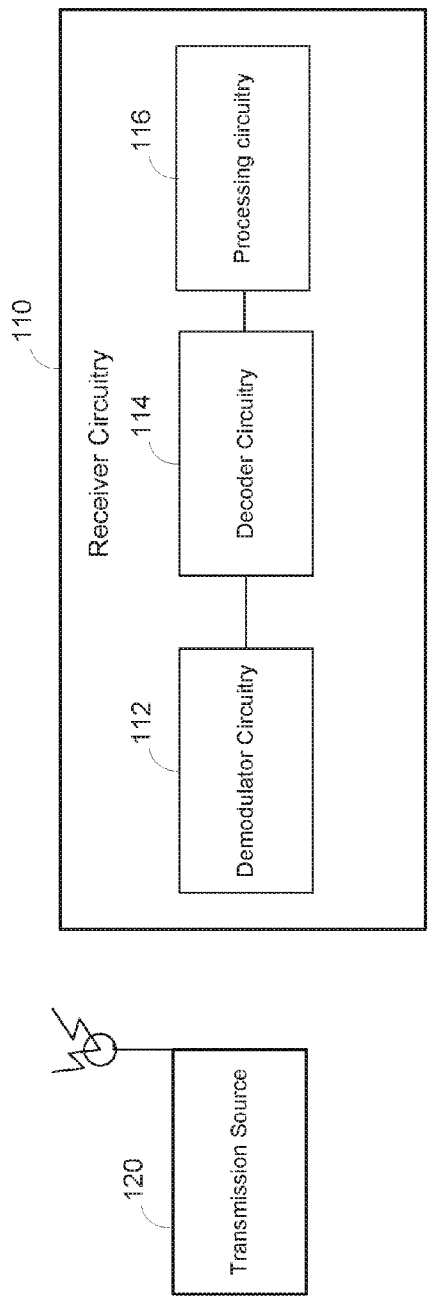
FIG. 1 shows an illustrative wireless communications system in accordance with some embodiments of the present disclosure.

FIG. 1 shows an illustrative wireless communications system 100 in accordance with some embodiments of the present disclosure. Wireless communications system 100 includes a transmission source 120 and receiver circuitry 110. Transmission source 120 may be a base station in a cellular environment that provides and receives data to/from receiver circuitry 110.

Transmission source 120 may include any number of antennas 122 (typically one, two, four or more) to transmit a data signal to a particular device. For example, processing circuitry (not shown) within transmission source 120 may be used to generate a data signal that includes periodic decoding information (e.g., decoding information that repeats over multiple frames of data that is transmitted). In particular, the processing circuitry may split received data into packets or frames of data and within each packet or frame a sub-packet or subframe may be used to store a repetition of the decoding information. Receiver circuitry 110 may determine a configuration necessary to decode the received data signal using one or more subframes contained within the frame that include decoding information. In some implementations, the decoding information may be periodic such that the sequence of decoding information is repeated for each packet or frame for a predetermined number of packets or frames (e.g., is repeated for each frame of four frames). For example, a sequence representing the decoding information may be included in the first subframe (e.g., subframe (SF) 0) of a frame and the same sequence or substantially the same sequence may repeat in the same subframe of each adjacent frame of data for four frames of the data. In some implementations, each frame includes 10 subframes.

In some implementations, the processing circuitry within transmission source 120 may include tail biting convolution coding circuitry, rate matching circuitry, scrambler circuitry, and modulation circuitry (none shown). The data signal may be provided to the tail biting convolution coding circuitry to be encoded with a particular rate (e.g., a rate of ⅓). In some implementations, these coded bits may be included in the decoding information transmitted to receiver circuitry 110. The coded bits may be scrambled by a scrambler circuitry and modulated before being transmitted to receiver circuitry 110.

For illustrative purposes, the present disclosure is described in the context of a system that transmits a data signal as frames of data having a periodicity of four (e.g., where the decoding information is repeated over four consecutive or sequential frames or packets), where each frame includes 10 subframes. In addition, within each sequential frame, the decoding information is included in a first of the 10 sequential subframes. In particular, the present disclosure is described in the context of a PCBH system having a coding scheme where the master information block (MIB) includes 24 bits of information, a 16-bit error detection code is used to generate 40 systematic bits, a tail biting convolution code with a ⅓ rate is used to encode the data and produce 120 coded bits and a rate matching process is applied to the coded bits to generate 1920 bits of decoding information. The teaching of the present disclosure may be applied to any other wireless communications system having any other code rate, rate matching process, MIB information and larger or smaller amount of error correction information or coding information.

In some embodiments, the decoding information may include time varying information and transmission source configuration information (e.g., the number of antennas used to transmit the signal). In some implementations, the decoding information may include information that defines the most essential physical layer information of a cell (transmission source). For example, the decoding information may include system bandwidth information, system frame number (SFN), control channel format information and/or the number of transmission source antenna ports.

In some embodiments, a cyclic redundancy code and/or other error detection code and/or error correction code information may be embedded or included in the decoding information provided in the subframe(s). In some implementations, the error detection code may be used by receiver circuitry 110 to determine whether a particular decoding configuration selected or used by receiver circuitry 110 to decode the signal is correct or incorrect.

Figure 2:
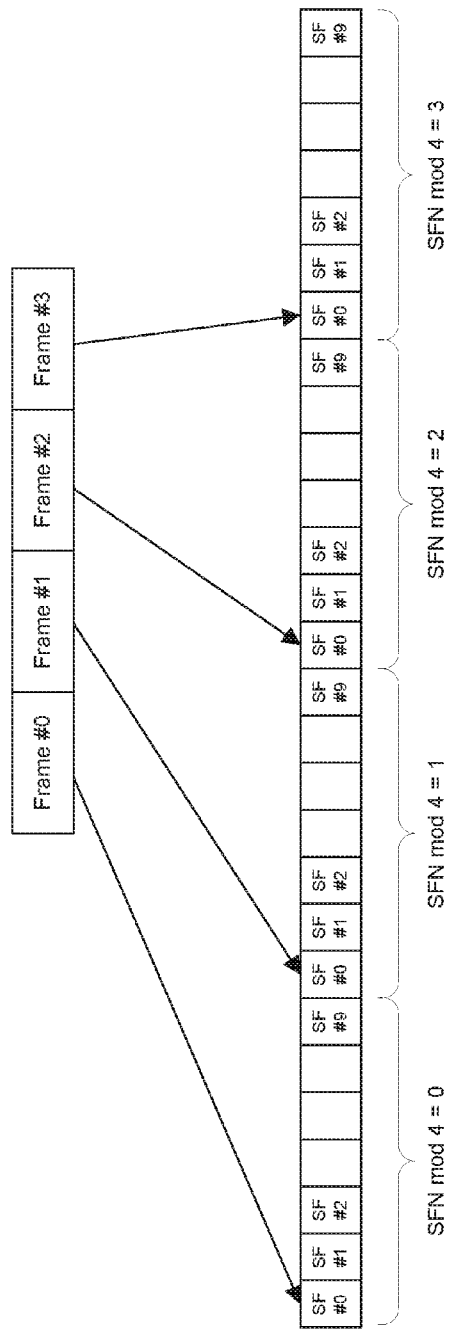
FIG. 2 shows an illustrative frame structure used in a wireless communications system in accordance with some embodiments of the present disclosure.

In some embodiments, the decoding information may be inserted in the frame starting at the beginning or starting subframe of each frame (i.e., the first subframe of a frame) at a fixed or predetermined frequency and time position. FIG. 2 shows an illustrative frame structure 200 used in a wireless communications system in accordance with some embodiments of the present disclosure. In particular, transmission source 120 may generate a data signal in accordance with frame structure 200 and transmit the generated data signal to receiver circuitry 110. Receiver circuitry 110 may be preconfigured to operate on data signals transmitted in accordance with frame structure 200 and may use the frame structure 200 to retrieve and determine what configuration is required to properly decode the received signal. Receiver circuitry 110 may configure its decoding circuitry in accordance with the determined configuration that is necessary to properly decode the received signal.

Referring back to FIG. 1, receiver circuitry 110 may be a cellular phone, PDA, mobile device, laptop, computing device, or any other suitable device used for communicating with a transmission source 120. Receiver circuitry 110 may have one or more antennas 130 for receiving the data signal transmitted by transmission source 120. Receiver circuitry 110 may include various communication circuitry (not shown) to de-modulate, descramble, compute channel estimates, perform Fourier Transform or other transform operations and decode the information received from transmission source 120. For example, demodulator circuitry 112 may include wireless communications circuitry that performs Fast Fourier Transform (FFT) operations and any other relevant wireless communications signal operations to extract data from a received signal. Demodulator circuitry 112 may provide the demodulated bits of information of the received signal to decoder circuitry 114.

Receiver circuitry 110 may initially not be configured to decode the data signal received from transmission source 120 because, for example, the number of antennas and/or the timing information (e.g., the scrambling method or type used to scramble the decoding information in a given subframe or packet) used to encode the signal may be unknown to receiver circuitry 110. Accordingly, receiver circuitry 110 may perform blind decoding operations to determine the transmission characteristics (e.g., number of antennas, mode type, or precoding configuration and decoding timing information) necessary to configure the receiver to decode the received signal.

In particular, receiver circuitry 110 includes decoder circuitry 114 which blindly and efficiently determines the transmission characteristics of the received signal. Decoder circuitry 114 is coupled to processing circuitry 116 which controls the operations of decoder circuitry 114. Decoder circuitry 114 is described in more detail below in connection with FIG. 3. After decoder circuitry 114 determines what the proper transmission characteristics of the received signal are, processing circuitry 116 may configure the decoding circuitry to decode subsequently received signals in accordance with the determined transmission characteristics.

Figure 3:
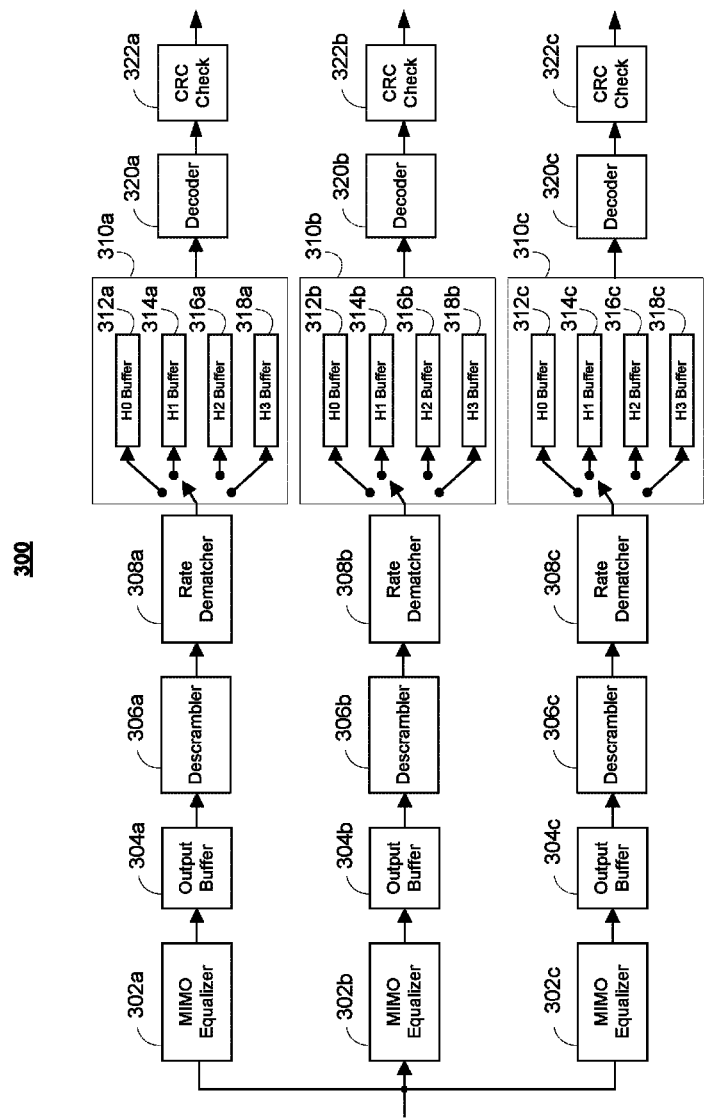
FIG. 3 shows an illustrative diagram of decoder circuitry for decoding a received data signal in accordance with some embodiments of the present disclosure.

FIG. 3 shows an illustrative diagram of decoder circuitry 300 for decoding a received data signal in accordance with some embodiments of the present disclosure. Decoder circuitry 300 may include multiple parallel signal paths, where each path corresponds to a signal received using a different number of transmission antennas. Each path of decoder circuitry 300 includes a multiple-input-multiple-output (MIMO) equalizer 302a-c, output buffer 304a-c, descrambler circuitry 306a-c, rate dematcher circuitry 308a-c, combining buffers 310a-c, decoders 320a-c and error detection circuitries 322a-c. Each combining buffer 310a-c may include one or more sequentially arranged combining buffers 312a-c, 314a-c, 316a-c and 318a-c. For the sake of brevity and not limitation, the operations of only one path are described below, but should be understood to be equally applicable to each of the other signal paths. Although only three signal paths are drawn, any number of additional or less signal paths or branches may be provided without departing from the teachings of the present disclosure.

Each path performs a decoding operation for the received signal based on a different assumption of the number of transmission antennas (or mode type or precoding configuration) used to transmit the received signal. Each path may perform similar operations but may differ in the type of MIMO equalizer circuitry used to operate on the received signal. More specifically, the type of MIMO equalizer circuitry used in a given path may depend on the number of transmission antennas (or mode type or precoding configuration) the given path assumes in attempting to decode the received signal. In some implementations, as discussed in more detail below, the outputs of each different MIMO equalizers 302a-c may be time-multiplexed into a single path that includes one of each output buffer 304, descrambler circuitry 306, rate dematcher circuitry 308, combining buffers 310, decoder 320 and error detection circuitry 322 to share the resources of the single path among each assumption or hypothesis as to the number of transmission antennas (or mode type or precoding configuration). Although drawn and described separately, MIMO equalizers 302a-c may be implemented as a single MIMO equalizer circuitry that is capable of performing MIMO equalization for each different assumption as to the number of transmission antennas (or mode type or precoding configuration) based on an operation selection input.

The path having each component labeled with the letter 'a' may correspond to decoding operations of the received signal assuming only one transmission antenna was used to transmit the signal. Similarly, the path having each component labeled with the letter 'b' may correspond to decoding operations of the received signal assuming two transmission antennas was used to transmit the signal. The path having each component labeled with the letter 'c' may correspond to decoding operations of the received signal assuming four transmission antennas was used to transmit the signal.

In some embodiments, decoder circuitry 300 may perform three parallel decoding operations using decoders 320a-c and three parallel error detections using CRC check circuitries 322a-c. The output of the CRC check circuitry 322a-c that indicates no errors were found in the decoded signal may indicate to decoder circuitry 300 the appropriate number of antennas used to transmit the received signal. In particular decoder circuitry 300 may output to processing circuitry 116 a signal indicating which path detected no errors in performing decoding of the received signal. In addition, decoder circuitry 300 may output a signal to processing circuitry 116 indicating which signal timing (or system frame number) within the indicated signal path resulted in no decoding errors. Processing circuitry 116 may use the received signals with the indications to configure decoder circuitry 300 or another decoder circuitry (not shown) to decode subsequently received signals with a decoding configuration corresponding to the number of antennas and signal timing (e.g., descrambling index of a pseudorandom number generator within a given descrambler) of the signal path that resulted in no errors.

In some implementations, processing circuitry 116 may configure decoding circuitry 300 to decode subsequently received signals using only the signal path and timing of the signal path that resulted in no errors as indicated by decoding circuitry 300 to processing circuitry 116. In some embodiments, processing circuitry 116 may initially control a demultiplexer (which receives a signal input and is control to output the received signal to one of two or more outputs) to output signal received by receiver circuitry 110 from transmission source 120 to a first decoder to place receiver circuitry 110 in training mode. The first decoder may implement decoder circuitry 300. Once the proper signal configuration is determined by the first decoder and based on the signals output by decoder circuitry 300 indicating the proper number of antennas and timing for decoding, processing circuitry 116 may configure a second decoder to operate on a received signal based on the proper number of antennas and timing. Processing circuitry 116 may control the demultiplexer to output the received signal to the second decoder instead of the first decoder in order to place receiver circuitry 110 in data acquisition mode.

MIMO equalizer 302a receives the demodulated data corresponding to the received signal and generates decision metrics corresponding to the received signal. In particular, MIMO equalizer 302a may include circuitry that uses channel estimates and the received signal to generate decision metric values (e.g., LLR values). In some implementations, the decision metrics are soft log likelihood ratio values. In some implementations, MIMO equalizer 302a generates the decision metrics for a subframe that includes decoding information. For example, when the decoding information is included in the first subframe of a frame, MIMO equalizer 302a may generate 480 decision metric values (LLR values) based on the first subframe.

The decision metrics output by MIMO equalizer 302a are stored in output buffer 304a. In some embodiments, the number of combining buffers 312a, 314a, 316a and 318a included in combining buffer 310a may correspond to (or depend on) the periodicity of the decoding information (e.g., the number of times the decoding information is repeated or over how many frames the decoding information is repeated). For example, when the decoding information in the received signal has a periodicity of four (or is repeated in four adjacent frames), combining buffer 310a may include four combining buffers. In addition, the size of each combining buffer 312a, 314a, 316a and 318a in combining buffer 310a is equal to the number of coded bits (e.g., 120-bits).

Although, each combining buffer 312a, 314a, 316a and 318a is described as being of a particular size, it should be understood that combining buffers 312a, 314a, 316a and 318a may be of any larger size but may be restricted to store a predetermined number of bits (e.g., 120 bits) based on the periodicity of the decoding information. In some implementations, the output of output buffer 304a may be provided to descrambler 306a which provides the descrambled bits to rate dematcher 308a. Descrambler 306a may descramble the received LLR value bits based on a first instance of sequential timing information (e.g., based on a first index in a pseudorandom number generator using a given seed) to produce a first version of the LLR values. After the descrambled bits are stored by rate dematcher 308a in a corresponding combining buffer 312a, 314a, 316a or 318a, descrambler 306a may descramble the same received bits from output buffer 304a based on a second instance of the sequential timing information (e.g., based on a second index in the pseudorandom number generator using the same seed) to produce a second version of the same LLR values. Descrambler 306a may continue to descramble the same bits of output buffer 304a using subsequent sequential instances of the timing information to produce different versions of the LLR values as rate dematcher 308a advances to store the descrambled bits into a next combining buffer in the sequence. This process may continue until rate dematcher 308a completes storing the different versions of the descrambled bits (e.g., different versions of the LLR values) in each combining buffer. Accordingly, each combining buffer may store a version of the LLR values that corresponds to a given instance of the sequential timing information (e.g., a differently scrambled version of the same LLR values).

In some embodiments, rate dematcher 308a may receive the descrambled output bits (e.g., 480-bits) of output buffer 304a and selectively store the bits into one of combining buffers 312a, 314a, 316a and 318a of combining buffer 310a based on the periodicity of the received signal and/or the currently selected instance of timing information used in the descrambling. For example, rate dematcher 308a may begin storing the first version of the descrambled bits in a first combining buffer 312a from the beginning of combining buffer 312a until the size or limit of that combining buffer is reached (e.g., the first 120-bits of the descrambled bits may be stored in combining buffer 312a). At that point rate dematcher 308a returns to the beginning of combining buffer 312a (e.g., wrap around the buffer) and continues storing the next portion of descrambled bits (e.g., the next 120-bits) of decision metrics in the same combining buffer 312a until the size or limit of that combining buffer is again reached. Rate dematcher 308a may continue the wrap around process of storing the descrambled bits into the same combining buffer in a circular manner such that as the size limit of the combining buffer is reached, rate dematcher 308a continues storing the descrambled bits in the beginning of the combining buffer until all of the descrambled bits are stored in the combining buffer.

As each bit is stored in the combining buffer, as discussed below, the combining buffer combines (e.g., accumulates) the newly received bits with the previously stored bits of descrambled decision metrics. Accordingly, each portion (e.g., corresponding to a size of the combining buffer) of the first version of the descrambled decision metrics is combined with an adjacent portion of the first version of the descrambled decision metrics until all portions are combined and stored in a given combining buffer. After all portions of the first version of the descrambled decision metrics are combined and stored in combining buffer 312a, rate dematcher 308a may receive the second version of the descrambled decision metrics. Rate dematcher 308a may similarly combine and store portions of the second version of the descrambled decision metrics with each other start with the next combining buffer 314a in the sequence of combining buffers adjacent to the combining buffer used to store the previous version of the decision metrics (e.g., combining buffer 312a). In particular, rate dematcher 308a may combine and store each 120-bit portion of the first version of the decision metrics into the first combining buffer 312a, combine and store each 120-bit portion of the second version of the decision metrics into the second combining buffer 314a, combine and store each 120-bit portion of a third version of the decision metrics into the third combining buffer 316a, and combine and store each 120-bit portion of a fourth version of the decision metrics into the fourth combining buffer 318a.

In some embodiments, portions of the version of the descrambled decision metrics may be of unequal size. In particular, some of the portions of the version of the descrambled decision metrics may be of an equal size that corresponds to a size of the combining buffers and other portions of the same version of the descrambled decision metrics may be of a smaller size than the size of the combining buffers. For example, the version of the descrambled decision metrics may include 432 bits and the combining buffers may each be 120 bits in size. Accordingly, the 432 bits of the version of the descrambled decision metrics may be split into three 120 bit portions and one 72 bit portion. In such circumstances, rate dematcher 308a may store and combine the bits of each portion into a given combining buffer sequentially until all the bits of the version of the descrambled decision metrics are stored. The last bit of the version may be stored and combined in the combining buffer at a position somewhere in the middle of the combining buffer because the portions of the version of the descrambled metrics are unequal. Accordingly, a pointer may be stored for the location in the combining buffer at which the last bit of the version of the decision metrics is stored.

When rate dematcher 308a returns to store a version of a second plurality of decision metrics in the combining buffer, rate dematcher 308a may start storing the bits of the version of the second plurality at the location of the pointer. Rate dematcher 308a may continue storing the bits of the version of the second plurality into the combining buffer until the end of the combining buffer is reached. At that point, rate dematcher 308a may wrap around to the beginning of the combining buffer to continue combining and storing all the bits of the version of the second plurality of decision metrics in a similar manner as the version of the first plurality of decision metrics.

In some implementations, rate dematcher 308a may be preconfigured to know how many bits are in each version of the decision metrics so that rate dematcher 308a can select the right sized portions of the version for combining and storing into the combining buffer. For example, when each version of a first plurality of decision metrics includes 432 bits, rate dematcher 308a may retrieve the first 120 bits of the 432 bits to combine and store into a first combining buffer (e.g., because the combining buffer is 120 bits in length). Rate dematcher 308a may then retrieve the next 120 bits of the 432 bits and combine those bits with the previously stored 120 bits in the combining buffer and store the combined version of the bits into the combining buffer. Rate dematcher 308a may then retrieve the next 120 bits of the 432 bits and combine those bits with the previously stored 120 bits in the combining buffer and store the combined version of the bits into the combining buffer. At this point, only 72 bits of the version of the first plurality of decision metrics are left. Accordingly, rate dematcher 308a may retrieve the last 72 bits of the 432 bits and combine those bits with the first 72 bits stored in the combining buffer and store the combined version of the bits into the combining buffer. Rate dematcher 308a may store a pointer to bit 72 in the combining buffer to indicate to rate dematcher 308a where to begin storing the version of a second plurality of decision metrics in the combining buffer.

For example, rate dematcher 308a may retrieve a number of bits of the 432 bits of a version of a second plurality of decision metrics corresponding to the number of bits remaining to be stored in the combining buffer after the bit indicated by the stored pointer. More specifically, rate dematcher 308a may start reading bits sequentially of the version of the second plurality of decision metrics and combine each bit sequentially with the bits in the combining buffer starting at the next bit following the bit indicated by the stored pointer (e.g., starting at bit 73 of the combining buffer). Rate dematcher 308a may continue storing and combining bits of the version of the second plurality of decision metrics in a similar manner wrapping around to the beginning of the combining buffer as the end or limit of the combining buffer is reached and storing a pointer to the location within the combining where the last bit of the version of the second plurality of decision metrics is stored.

This process of combining and storing bits of versions of decision metrics and storing pointers to the last bit location continues for each version combined and stored in a respective combining buffer. This process is particularly useful when portions of the version of the decision metrics are not of equal size that corresponds to a size of the combining buffer. The same process may be applied when the portions of the version of the decision metrics are of equal size (e.g., 120 bit portions of a 480 bit version of the decision metrics) that corresponds to a size of the combining buffer (e.g., 120 bits). However, in such circumstances, the pointer indicating where the last bit of the version of the decision metrics is stored may always indicate the same bit location (e.g., bit 0 location) within the combining buffer because rate dematcher 308a wraps around combining and storing bits into the combining buffer an equal number of times and may always combine and store the last bit to the last bit position in the combining buffer.

In some implementations, prior to storing the descrambled portion of the bits corresponding to a version of the decision metrics into a given combining buffer 312a, 314a, 316a or 318a, rate dematcher 308a may combine the previously stored contents of the given combining buffer 312a, 314a, 316a or 318a with the portion of bits that needs to be stored. In some implementations, each combining buffers 312a, 314a, 316a or 318a or some of combining buffers 312a, 314a, 316a and 318a may be configured to always or automatically combine the contents or data bits received from rate dematcher 308a with the previously stored contents in the combining buffer. Each combining buffer 312a, 314a, 316a or 318a may be equipped with a reset input that clears out or makes all the data stored in the combining buffer 312a, 314a, 316a or 318a equal to zero or some other predetermined number. In particular, the reset input may configure the combining buffer to overwrite previously stored contents with the newly received contents from rate dematcher 308 instead of combining the previously stored contents with the newly received contents.

In some embodiments, previously stored contents in combining buffer 312a, 314a, 316a or 318a may be combined with newly received contents from rate dematcher 308a by performing any suitable mathematical function or Boolean operation. For example, the previously stored contents may be combined with newly received contents using an XOR Boolean expression. Alternatively, the previously stored contents may be summed or accumulated with the newly received contents. Any other type of mathematical operation (e.g., multiply, divide, subtract, etc.) may be used to combine previously stored contents in combining buffers 312a, 314a, 316a and 318a with newly received content from rate dematcher 308a. In particular, each combining buffer 312a, 314a, 316a and 318a may be equipped with summing circuitry that computes a sum of the currently stored contents in the combining buffer with newly received contents to be stored. The summing circuitry may store the computed sum in the corresponding combining buffer 312a, 314a, 316a or 318a.

Rate dematcher 308a may select which combining buffer 312a, 314a, 316a or 318a to start storing portions of the first version of the descrambled bits of the decision metrics and subsequent versions of the decision metrics based on the timing of the decoding information (e.g., based on which repetition of decoding information or frame number corresponds to the decision metrics stored in output buffer 304a). In particular, contents stored in each combining buffer 312a, 314a, 316a and 318a may be generated based on different received signal timing (i.e., different repetitions of the decoding information). Accordingly, when the output of one of combining buffers 312a, 314a, 316a and 318a is operated on by decoder 320a and CRC check circuitry 322a and is indicated to lack errors, an indication of timing (e.g., which repetition or frame in the sequence of frames that include the repeated decoding information) may be provided to processing circuitry 116. More specifically, each combining buffer 312a-c, 314a-c, 316a-c and 318a-c represents a different SFN hypotheses used to compute and decode the received signal. When the hypothesis is proved to be correct by error detection circuitry (e.g., CRC check circuitry 322a-c), that SFN is used to decode subsequently received signals.

Figure 4:
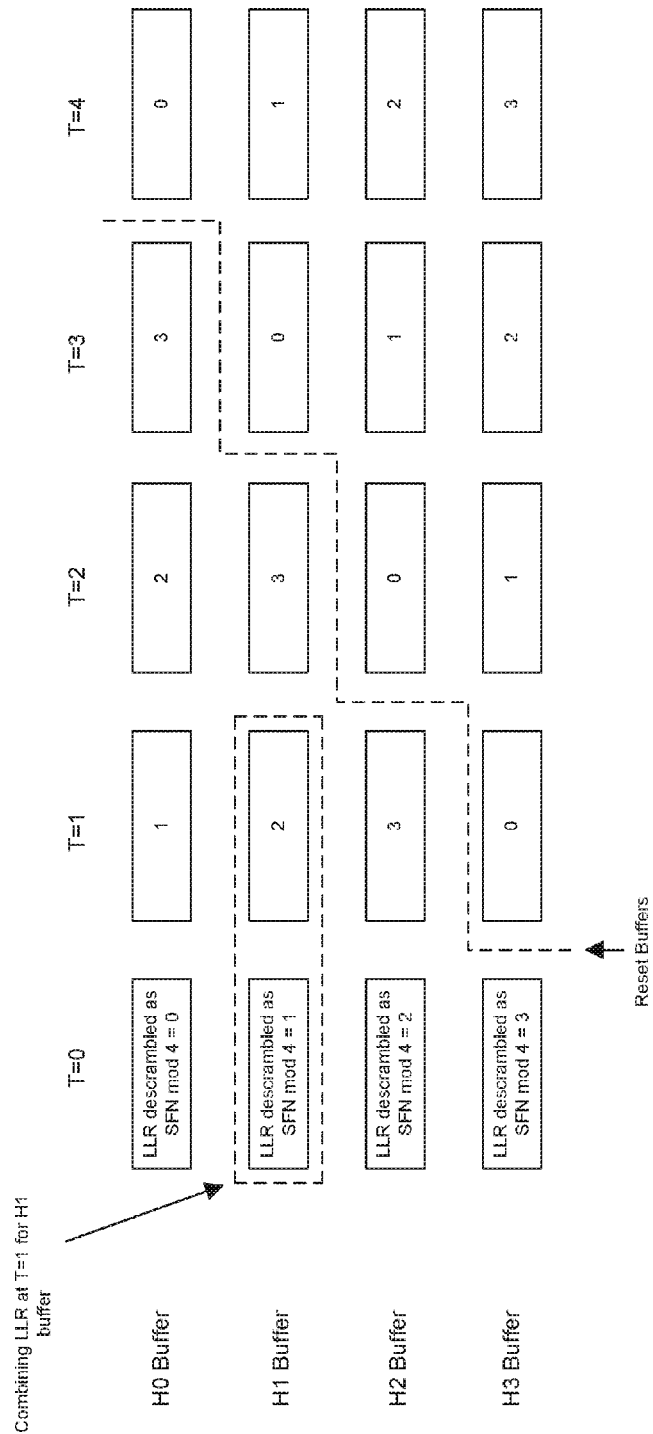
FIG. 4 shows an illustrative timing diagram for storing periodic decision metrics in combining buffers in accordance with some embodiments of the present disclosure.

The operation of rate dematcher 308a is better understood with reference to FIG. 4 which shows an illustrative timing diagram 400 for storing periodic decision metrics in combining buffers 310a-c in accordance with some embodiments of the present disclosure. In particular, during a first time interval (i.e., during T=0), a first plurality of decision metrics corresponding to a first repetition of decoding information included in a first frame is stored in output buffer 304a. The first plurality of decision metrics may be descrambled by descrambler 306a using a first instance of timing information to produce a first version of the first plurality of decision metrics. Rate dematcher 308a may begin storing the first version of the first plurality of decision metrics in first combining buffer 312a wrapping around first combining buffer 312a as the limit of combining buffer 312a is reached until all bits of the first version of the first plurality of decision metrics are stored. After all the bits of the first version are stored, the first plurality of decision metrics may be descrambled by descrambler 306a using a second instance of timing information adjacent to the first instance of timing information to produce a second version of the first plurality of decision metrics. Rate dematcher 308a may store the second version of the decision metrics in a similar manner into an adjacent combining buffer and may continuously advance to each subsequent combining buffer 314a, 316a and 318a in sequence for each different version of the decision metrics. More particularly, descrambler 306a may produce sequential versions of the first plurality of decision metrics each corresponding to a different instance of the sequential timing information and these sequential versions are sequentially combined and stored into one of the corresponding combining buffers.

As each bit is stored in the respective combining buffer, the combining buffer combines the received bits with previously stored contents in the respective combining buffer. For example, combining buffer 312a may receive data from rate dematcher 308a and combine (e.g., sum or accumulate) the received data with the previously stored contents in combining buffer 312a. Similarly, combining buffers 314a, 316a and 318a may receive respective portions of the respective versions of the first plurality of decision metrics from rate dematcher 308a and combine the received data with the previously stored contents in respective combining buffer 312a, 316a and 318a.

After storing the bits of the first plurality of decision metrics, rate dematcher 308a may reset the contents of the last combining buffer in the sequence (i.e., the combining buffer which will store the portion of the plurality of descrambled decision metrics corresponding to the timing information last in the sequence) after the contents of the combining buffers are sent to decoder 320a and CRC check circuitry 322a. For example, when rate dematcher 308a selects first combining buffer 312a as the first combining buffer in the combining buffer sequence into which to store the first version of the first plurality of decision metrics, rate dematcher 308a may reset combining buffer 318a after storing each of the bits of the last version in the sequence of versions of the first plurality of decision metrics in the combining buffers and after the corresponding bits stored in the combining buffers are used by decoder 320 and CRC check circuitry 322. This is because combining buffer 318a will be the last combining buffer in the sequence that will be used to store the last version in the sequence of versions of the bits of the first plurality of decision metrics. Similarly, when rate dematcher 308a selects second combining buffer 314a as the first combining buffer in the combining buffer sequence into which to store the first version of the bits of the decision metrics, rate dematcher 308a may reset combining buffer 312a. This is because, in this circumstance, combining buffer 312a will be the last combining buffer that will be used to store the last version in the sequence of versions of the bits of the decision metrics.

Rate dematcher 308a may reset a given combining buffer by asserting the reset input of the combining buffer. Asserting the reset input may cause the combining buffer to overwrite the previously stored contents with newly provided data and/or setting all the previously stored values to zero or some other predetermined value.

During a second time interval (i.e., during T=1), a second plurality of decision metrics corresponding to a second repetition of decoding information included in a second frame of data is stored in output buffer 304a. The second plurality of decision metrics may be descrambled by descrambler 306a using the first instance of timing information to produce a first version of the second plurality of decision metrics. Rate dematcher 308a may begin storing the portions of the first version of the second plurality of decision metrics in a similar manner as discussed above for the first version of the first plurality of decision metrics but this time starting to store the first version in the last combining buffer 318a instead of combining buffer 312a (as in T=0). Rate dematcher 308a may continuously advance to each subsequent combining buffer 312a, 314a and 316a in sequence after all the bits of one version of the second plurality of decision metrics are combined and stored in each respective combining buffer in a circular manner and until all versions of the second plurality of decision metrics are combined and stored into respective combining buffers. In particular, as the first version of the second plurality of decision metrics is combined and stored in the last combining buffer in the sequence (e.g., combining buffer 318a which is positioned last in the sequence), rate dematcher 308a returns to the next combining buffer in the combining buffer sequence (e.g., combining buffer 312a which is positioned first in the sequence) to continue storing the next version of the second plurality of decision metrics. As discussed above, as each portion of the decision metrics is combined and stored in the respective combining buffer, the combining buffer combines the received portion with previously stored contents in the respective combining buffer.

The different versions of the decision metrics (e.g., the decision metrics descrambled using a different instance or different index in the pseudorandom number sequence) are combined and stored in a circular manner in the combining buffers starting with the next adjacent combining buffer, at each subsequent time interval (e.g., repetition of the decoding information). In particular, rate dematcher 308*a* advances the selection of a combining buffer in which to begin storing the first version of the decision metrics to the combining buffer that is adjacent to the combining buffer selected to start storing the first version of the decision metrics in the previous time interval (e.g., for the previously received frame or packet of data). More specifically, as each repetition of the decoding information is received (over each frame or packet of data), new decision metrics are computed and stored in output buffer 304*a*. Different versions of those new decision metrics are combined and stored in combining buffers starting with the first of those versions in the sequence being combined and stored into a combining buffer adjacent to a combining buffer used to start storing a first of the versions in the sequence of the decision metrics for a previous repetition of the decoding information. This process repeats a number of times corresponding to the number of times the decoding information is repeated (e.g., 4 times or the periodicity of the decoding information).

More specifically, at the first time interval (T=0), rate dematcher 308*a* combines and stores the first version of a first plurality of decision metrics corresponding to a first repetition of the decoding information starting with combining buffer 312*a*. This causes the different versions of the first plurality of decision metrics to be arranged as follows: combining buffer 312*a* stores a combined first version of the first plurality of decision metrics, combining buffer 314*a* stores a combined second version of the first plurality of decision metrics, combining buffer 316*a* stores a combined third version of the first plurality of decision metrics and combining buffer 318*a* stores a combined fourth version of the first plurality of decision metrics. The term "combined" preceding the term "version", indicates the given version of the decision metrics includes the combination of the different portions of the version of the decision metrics based on the size of the combining buffer (e.g., combinations of adjacent 120-bit portions of the version of the decision metric until all portions are combined when the combining buffer is 120 bits in size).

At the second time interval (T=1), rate dematcher 308*a* combines and stores the first version of a second plurality of decision metrics corresponding to a second repetition of the decoding information starting with combining buffer 318*a*. This causes the different versions of the second plurality of decision metrics to be arranged as follows: combining buffer 312*a* stores a combined second version of the second plurality of decision metrics, combining buffer 314*a* stores a combined third version of the second plurality of decision metrics, combining buffer 316*a* stores a combined third version of the second plurality of decision metrics, and combining buffer 318*a* stores a combined first version of the second plurality of decision metrics. The remaining iterations over the subsequent time intervals (subsequently received repetitions of the decoding information) are shown in timing diagram 400, where the numbers within each box represent the corresponding combined version of the decision metrics stored in the respective buffer during the indicated time interval (e.g., corresponding to a different plurality of decision metrics). As referred to above and below, the phrase "first version" represents use of a first index in a pseudorandom number sequence (time instance) by the descrambler to descramble a plurality of decision metrics, "second version" represents use of a second index in the pseudorandom number sequence (time instance) by the descrambler to descramble a plurality of decision metrics, "third version" represents use of a third index in the pseudorandom number sequence (time instance) by the descrambler to descramble a plurality of decision metrics and "fourth version" represents use of a fourth index in the pseudorandom number sequence (time instance) by the descrambler to descramble a plurality of decision metrics.

The sequence depicted in timing diagram 400 is performed in parallel for each path and in particular by each rate dematcher 308*a-c* and combining buffers 310*a-c*. During each time interval, the outputs of each combining buffer within combining buffers 310*a-c* that has completed combining the previously stored contents (or overwriting previously stored contents) are provided to a respective decoder 320*a-c*. In some implementations, the outputs of each combining buffer within combining buffers 310*a-c* are provided to a respective decoder 320*a-c* after rate dematcher 308*a-c* completes storing the bits of the decision metrics into each of the combining buffers in combining buffers 310*a-c*.

In some embodiments, instead of performing the sequence depicted in timing diagram 400 in parallel for each path, the sequence may be performed in a serial manner. Performing the sequence depicted in timing diagram 400 and described above in a serial manner instead of parallel may require reduced amount of hardware as more hardware can be shared and may save power. In particular, to perform the blind decoding discussed above and below in an efficient manner, the outputs of each MIMO equalizer 302*a-c* may be input to a single instance of output buffer 304, descrambler 306, rate dematcher 308, decoder 320 and CRC check circuitry 322 in a time-multiplexed manner. Multiple instances of combining buffers 310*a-c* may still be needed to store the descrambled and rate dematched data of the decision metrics corresponding to a given repetition of the decoding information. Accordingly, the output of the single instance of rate dematcher 308 may be time-demultiplexed to be provided to the appropriate combining buffer 310*a-c* corresponding to the MIMO equalizer 302*a-c*. In addition, the output of each combining buffers 310*a-c* may be time-multiplexed in a similar fashion as the outputs of each MIMO equalizer 302*a-c* to be provided to the single instance of decoder 320 and CRC check circuitry 322.

In some implementations, to implement the blind decoding in a serial manner, three multiplexers may be provided. A first multiplexer may be placed between the outputs of MIMO equalizers 302*a-c* and the input to the single instance of output buffer 304. A second demultiplexer may be placed between the output of rate dematcher 308 and the inputs to the appropriate combining buffer 310*a-c*. A third multiplexer may be placed between the outputs of combining buffer 310*a-c* and the input to the single instance of decoder 320 and CRC check circuitry 322. The select inputs of each multiplexer may be coupled to receive an identical signal that chooses the appropriate select inputs of each multiplexer based on which assumption or hypothesis on the number of antennas (or mode type or precoding configuration) are used to transmit the received data signal.

For example, during the first time interval (corresponding to a first repetition of the decoding information), a first plurality of decision metrics output by MIMO equalizer 302*a* (corresponding to a first assumption on the number of antennas (or mode type or precoding configuration)) may be input to output buffer 304*a*. After the data stored in output buffer 304*a* is processed by descrambler 306*a* and rate dematcher 308*a*, the first plurality of descrambled decision metrics may be stored in combining buffers 310*a*. The output of combining buffers 310*a* may be provided to decoder 320*a* and then to CRC check circuitry 322*a* to determine whether the decoding operation using the first assumed decoder configuration is correct.

When the assumed decoding configuration is determined to be incorrect, processing circuitry 116 may change a select input of the first multiplexer to provide an output of MIMO equalizer 302b (corresponding to a second assumption on the number of antennas (or mode type or precoding configuration)) to output buffer 304a. After the data stored in output buffer 304a is processed by descrambler 306a and rate dematcher 308a, the plurality of descrambled decision metrics may be stored in combining buffers 310b by processing circuitry 116 selecting an input of the second multiplexer. The output of combining buffers 310b may be provided, by processing circuitry 116 selecting an input of the third multiplexer, to decoder 320a and then to CRC check circuitry 322a to determine whether the decoding operation using the second assumed decoder configuration is correct.

When the second assumed decoding configuration is determined to be incorrect, processing circuitry 116 may change a select input of the first multiplexer to provide an output of MIMO equalizer 302c (corresponding to a third assumption on the number of antennas (or mode type or precoding configuration)) to output buffer 304a. After the data stored in output buffer 304a is processed by descrambler 306a and rate dematcher 308a, the plurality of descrambled decision metrics may be stored in combining buffers 310c by processing circuitry 116 selecting an input of the second multiplexer. The output of combining buffers 310c may be provided, by processing circuitry 116 selecting an input of the third multiplexer, to decoder 320a and then to CRC check circuitry 322a to determine whether the decoding operation using the third assumed decoder configuration is correct.

When the third assumed decoding configuration is determined to be incorrect, a second repetition of the decoding information from a second frame is processed in a similar manner. In particular, the serial process, discussed above, of selecting different outputs of the MIMO equalizers and combining buffers is repeated, in a loop, for each repetition of the decoding information in the received signal. The serial process may terminate as soon as any iteration and assumption of the decoder configuration is determined to be correct. Upon such a determination of the correct decoder configuration, processing circuitry 116 may determine how many antennas (or mode type or precoding configuration) were used to transmit the received signal and the timing information of the decoding information based on which MIMO equalizer 302a-c and combining buffer of combining buffers 310a-c resulted in CRC check circuitry 322a detecting no errors in decoding using the selected decoding configuration.

Referring back to the parallel configuration of decoder 114, decoders 320a-c decode the received signal based on the outputs of respective combining buffers 310a-c and decoders 320a-c output the decoded data to respective check circuitries 322a-c. Check circuitries 322a-c each perform an error checking process on the decoded data to determine whether the hypothesis or guess as to the number of antennas and current timing of the decoding information is correct. Typically, only one of check circuitries 322a-c will output a signal indicating that a hypothesis is correct. The check circuitry 322a-c that outputs the signal indicating the hypothesis is correct represents the number of antennas (or mode type or precoding configuration) used to transmit the received signal (e.g., based on which path or branch 'a', 'b', or 'c' resulted in data that was successfully decoded) and the timing of the decoding information (e.g., based on which combining buffer output was correctly decoded). As referred to herein, time interval represents a single repetition of the periodic decoding information in one of the multiple sequential or contiguous frames that each includes a repetition of the decoding information.

FIG. 5 shows an illustrative flow diagram 500 of an exemplary process for decoding data having embedded periodic decoding information in accordance with some embodiments of the present disclosure. At 504, a first plurality of decision metrics corresponding to a first repetition of the periodic decoding information is stored in a memory, wherein the first plurality of decision metrics is grouped into a plurality of sequential portions.

At 506, a plurality of combined versions of the sequential portions is stored into a plurality of combining buffers that are arranged in sequence, wherein each combined version is associated with a different sequence of timing information.

At 508, a first of the plurality of combined versions stored in a first of the combining buffers is combined with a second version of a sequential portion of a second plurality of decision metrics that corresponds to a second repetition of the periodic decoding information, wherein the second version of the sequential portions is associated with timing information adjacent in the timing information sequence to the timing information associated with the first combined version.

At 510, the received data is decoded based on information stored in the plurality of combining buffers The foregoing describes systems and methods for decoding data with decoding-information embedded. Those skilled in the art will appreciate that the described embodiments of the present disclosure may be practiced by other than the described embodiments, which are presented for the purposes of illustrative rather than of limitation.

Furthermore, the present disclosure is not limited to a particular implementation. For example, one or more steps of methods described above may be performed in a different order (or concurrently) and still achieve desirable results. In addition, the disclosure may be implemented in hardware, such as on an application specific integrated circuit (ASIC) or on a field-programmable gate array (FPGA), both of which may include additional communication circuitry (e.g., radio-frequency circuitry). Alternatively, the present disclosure may also be implemented in software running on any suitable hardware processor. Accordingly, equivalents may be employed and substitutions made, where appropriate, by those skilled in the art herein without departing from the scope of the present disclosure as recited in the claims that follow.

What is claimed is:

1. A method for decoding data, the method comprising:
receiving a first decision metric associated with first timing information, wherein the first decision metric corresponds to a first instance of received periodic decoding information;
accumulating, using a storage device, a first portion of the first decision metric with an adjacent second portion of the first decision metric, wherein the storage device comprises a plurality of portions, and wherein the accumulating is performed using a first of the plurality of portions of the storage device;
receiving a second decision metric different from the first decision metric associated with second timing information different from the first timing information, wherein the second decision metric corresponds to a second instance of received periodic decoding information different from the first instance of received periodic decoding information; and accumulating, using the storage device, portions of the second decision metric with the accumulated portions of the first decision metric, wherein the accumulating is performed using the first of the plurality of portions of the storage device;

receiving, before the second instance of the received periodic decoding information is received, a third decision metric associated with the second timing information wherein the third decision metric corresponds to the first instance of the received periodic decoding information; and accumulating, using a second portion of the storage device, adjacent portions of the third decision metric.

2. The method of claim 1, wherein the storage device comprises a plurality of combining buffers, further comprising:

during a first time interval corresponding to a first received frame of data that includes a first repetition of the periodic decoding information:
descrambling the first decision metric based on the first timing information;
accumulating adjacent portions of the descrambled first decision metric using a first of the plurality of combining buffers; and
repeating the descrambling and the accumulating for the second timing information.

3. The method of claim 1 further comprising:
decoding a plurality of bits corresponding to the data based on information stored in the storage device; and
applying an error detection code to the decoded plurality of bits to determine whether the decoded plurality of bits is valid.

4. The method of claim 1, wherein each of the first and second decision metrics comprises log-likelihood ratios (LLRs) for code bits of the periodic decoding information included in one of a plurality of received frames.

5. The method of claim 1, wherein the storage device comprises a plurality of combining buffers.

6. The method of claim 1 further comprising:
receiving a fourth decision metric associated with the first timing information after the first instance of the received period decoding information is received, wherein the fourth decision metric corresponds to the second instance of the received periodic decoding information; and
accumulating, using the second portion of the storage device, portions of the fourth decision metric with information previously stored in the second portion of the storage device.

7. A system for decoding data, the system comprising:
a storage device wherein the storage device comprises a plurality of portions; and
control circuitry configured to:
receive a first decision metric associated with first timing information, wherein the first decision metric corresponds to a first instance of received periodic decoding information;
accumulate, using the storage device, a first portion of the first decision metric with an adjacent second portion of the first decision metric, wherein the accumulating is performed using a first of the plurality of portions of the storage device;
receive a second decision metric different from the first decision metric associated with second timing information different from the first timing information, wherein the second decision metric corresponds to a second instance of received periodic decoding information different from the first instance of received periodic decoding information;
accumulate, using the storage device, portions of the second decision metric with the accumulated portions of the first decision metric, wherein the accumulating is performed using the first of the plurality of portions of the storage device;
receive, before the second instance of the received periodic decoding information is received, a third decision metric associated with the second timing information, wherein the third decision metric corresponds to the first instance of the received periodic decoding information; and
accumulate, using a second portion of the storage device, adjacent portions of the third decision metric.

8. The system of claim 7, wherein the storage device comprises a plurality of combining buffers, and wherein the control circuitry is further configured to:
during a first time interval corresponding to a first received frame of data that includes a first repetition of the periodic decoding information:
descramble the first decision metric based on the first timing information;
accumulate adjacent portions of the descrambled first decision metric using a first of the plurality of combining buffers; and
repeat the descrambling and the accumulating for the second timing information.

9. The system of claim 7, wherein the control circuitry is further configured to:
decode a plurality of bits corresponding to the data based on information stored in the storage device; and
apply an error detection code to the decoded plurality of bits to determine whether the decoded plurality of bits is valid.

10. The system of claim 7, wherein each of the first and second decision metrics comprises log-likelihood ratios (LLRs) for code bits of the periodic decoding information included in one of a plurality of received frames.

11. The system of claim 7, wherein the storage device comprises a plurality of combining buffers.

12. The system of claim 7, wherein the control circuitry is further configured to:
receive a fourth decision metric associated with the first timing information after the first instance of the received period decoding information is received, wherein the fourth decision metric corresponds to the second instance of the received periodic decoding information; and
accumulate, using the second portion of the storage device, portions of the fourth decision metric with information previously stored in the second portion of the storage device.

* * * * *